United States Patent [19]

Ray

[11] 4,037,441
[45] July 26, 1977

[54] BICYCLE LOCK
[76] Inventor: Robert D. Ray, 1000 E. 9th, Edmond, Okla. 73034
[21] Appl. No.: 662,556
[22] Filed: Mar. 1, 1976
[51] Int. Cl.² ............................................. B62H 5/00
[52] U.S. Cl. ........................................ 70/233; 70/49
[58] Field of Search ................ 70/14, 18, 30, 58, 49, 70/76, 233, 234, 235; 242/84.4, 84.41, 86.61, 100, 106, 107.6, 107.7, 158 R, 158.1, 158.2

[56]              References Cited
          U.S. PATENT DOCUMENTS

| 870,908 | 11/1907 | Sholes ............................ 242/107.6 |
| 1,794,825 | 3/1931 | Benedict ........................ 242/107.7 |
| 1,971,498 | 8/1934 | Norling ........................... 242/107.6 |
| 1,977,347 | 10/1934 | Namet ............................. 242/100 |
| 2,451,100 | 10/1948 | Lecompte ....................... 242/107.6 |
| 2,933,915 | 4/1960 | Gossner ............................... 70/49 |
| 3,067,965 | 12/1962 | Breithaupt ....................... 242/84.4 |
| 3,228,217 | 1/1966 | Atwill ................................. 70/58 |
| 3,844,146 | 10/1974 | Fouces et al. ................... 70/233 X |
| 3,906,758 | 9/1975 | Hurwitt ............................. 70/233 |
| 3,910,081 | 10/1975 | Pender .............................. 70/233 |

FOREIGN PATENT DOCUMENTS

| 516,640 | 9/1955 | Canada ............................... 242/100 |
| 866,462 | 5/1941 | France ................................. 70/234 |
| 728,870 | 4/1932 | France ................................. 242/100 |
| 120,384 | 12/1947 | Sweden ............................... 70/58 |
| 123,470 | 11/1948 | Sweden ............................... 70/58 |

*Primary Examiner*—Roy D. Frazier
*Assistant Examiner*—Thomas J. Holko
*Attorney, Agent, or Firm*—William R. Laney

[57]                ABSTRACT

A bicycle lock including a drum housing having a cable reel rotatably mounted in said drum housing on a shaft extending through the housing. A torsion spring is operatively connected between the shaft and the reel and is placed in tension by the rotation of the reel in one direction upon the shaft. A two part bar clamp is secured to the outer side of the housing for clamping the housing to one of the bars of a bicycle frame. A flexible securing cable having a lock on one end has its other end portion wound around the reel, and extends through a guide ring secured to the housing in alignment with an opening in one side of the housing. A safety cable is extended from a point of securement on one side of the reel housing to a point of securement to the guide ring, with a bight portion positioned between the points of securement of the safety cable.

15 Claims, 5 Drawing Figures

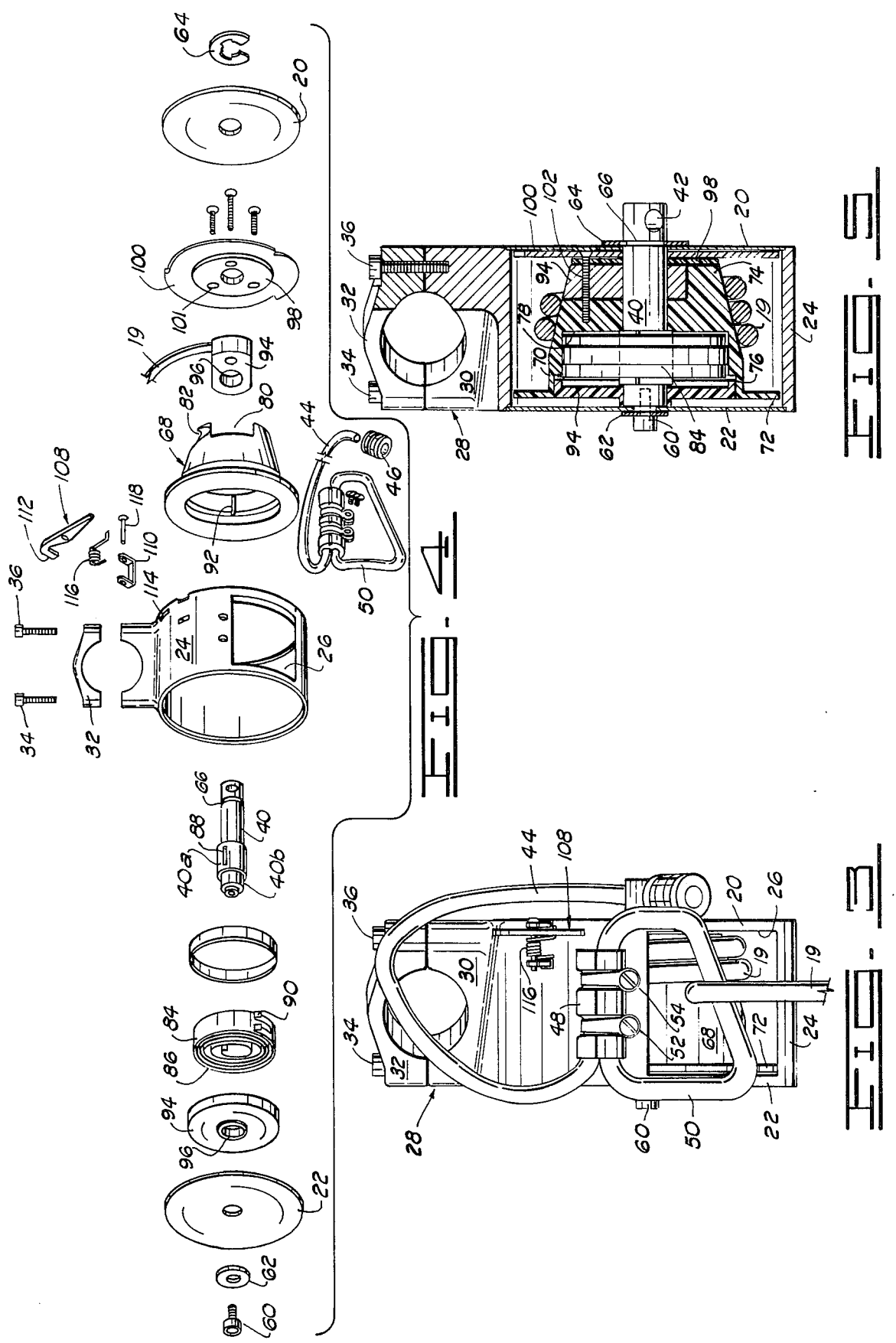

BICYCLE LOCK

BACKGROUND OF THE INVENTION

1. Field of the Invention

This invention relates to bicycle locks, and more particularly, to those types of bicycle locks which employ flexible cables for securing a bicycle to a stationary structure.

2. Brief Description of the Prior Art

A number of types of bicycle locks have been previously proposed for use in securing bicycles against theft when they are left unattended by the rider. On many older types of locks, simple padlocks are used which have an elongated clasp which interlocks the spokes of one of the bicycle wheels with portions of the frame of the bicycle. This type of lock, of course, prevents riding of the bicycle, but does not deter one who might wish to purloin the bicycle by bodily lifting it into a vehicle to carry it away. More recently, chain and cable-type locks have been provided which are anchored in some fashion to some part of the frame of the bicycle and have a cable or chain of sufficient length to be engaged around a tree or post at the location where the bicycle is to be left. In some instances, the lock thus provided is simply an elongated flexible cable which carries locking elements on its opposite ends, and which can be extended through the frame and around the tree or the stationary structure, and the ends then locked together to secure the bicycle to the structure. In the case of this type of lock, some inconvenience is experienced by the cyclist in storing or carrying the chain or cable when the bicycle is in use. Additionally, since the lock of this type is not made a part of, or secured to, the bicycle, the problem is often experienced of not having the lock with the rider at an unforeseen time when it is desirable to leave the bicycle at some location not anticipated by the rider.

In those types of cable or chain locks which are characterized in having one end of the cable secured to the frame of the bicycle, it is still necessary to store, or in some manner place, the length of the cable in an out-of-the-way location at the time of riding the bicycle so that it does not interfere with riding. To this end, some types of locks of locks of this sort have included reels or drums rotatably mounted on the frame of the bicycle and facilitating reeling up the length of the cable when it is not in use. The reeling of the cable upon the reel or drum is, however, often time consuming and must be carefully done so that the convolutions of the cable upon the reel or drum are evenly spaced in an axial fashion along the drum, and not bunched up or jammed on the reel.

Another problem which is encountered with bicycle lock structures which are characterized in having one end of an elongated cable secured in some fashion to the frame of the bicycle is that the fastening structures used for this purpose often are merely bolted to the frame of the bicycle, and can be quickly and easily removed by a thief using relatively simple tools.

BRIEF DESCRIPTION OF THE PRESENT INVENTION

The present invention provides an improved bicycle lock of the cable type which can be quickly and easily used without difficulty, and with assurance against malfunction of the moving parts of the lock structure. The lock incorporates safety features which provide further safeguards against destruction of the lock or removal of parts of it from the bicycle in a way permitting the locking function to be rendered ineffectual.

Broadly described, the bicycle lock of the invention includes a drum housing which has a cable reel rotatably mounted internally therein upon a shaft which is projected through the drum housing. A torsion spring is connected between the cable reel and the shaft, which is fixed to the housing, so that when the reel is turned on the shaft in one direction, the torsion spring is placed in tension. The spring thus functions to cause rotation of the reel in an opposite, winding-up direction after a cable has been unwound from the reel for locking purposes. The locking or securing cable which is wound upon the reel is extended from the reel through an opening in one side of the drum housing, and through a guide ring which is secured to the housing in alignment with this opening. A safety cable is extended from a point of securement on one side of the reel housing to a point of securement to the guide ring. A bight portion is defined in the safety cable between these points of securement. In a preferred embodiment of the invention, the reel carries a ratchet plate which is keyed to the reel for rotation therewith, and a ratchet engaging pawl lever is pivotally secured to the outer side of the housing, and includes a part projecting through a hole in the housing into engagement with the teeth of the ratchet plate.

An important advantage of the invention is to provide a cable type bicycle lock which can be quickly and easily installed at a selected location on a bicycle of substantially any type.

Another object of the invention is to provide a cable-type bicycle lock which includes a reel-containing storage housing which functions to connect one end of the cable to a bicycle in a manner which makes the cable difficult to clandestinely remove from the bicycle frame.

A further object of the invention is to provide a bicycle which includes an elongated cable facilitating securement of the bicycle to a stationary object by the use of the cable, which cable is used in combination with a self-storing reel structure which automatically retracts and stores the cable when it is not in use.

Additional objects and advantages of the invention will become apparent as the following detailed description of the invention is read in conjunction with the accompanying drawings which illustrate the invention.

GENERAL DESCRIPTION OF THE DRAWINGS

FIG. 3 is a front elevation view of the bicycle lock of the invention as it appears when viewed from the side thereof from which the securing cable is extended.

FIG. 4 is an exploded view of the bicycle lock of the invention.

FIG. 5 is a vertical sectional view of the bicycle lock taken through the center of the lock, and having the safety cable forming a part of the lock removed.

DETAILED DESCRIPTION OF THE PREFERRED EMBODIMENT OF THE INVENTION

Figure 1:
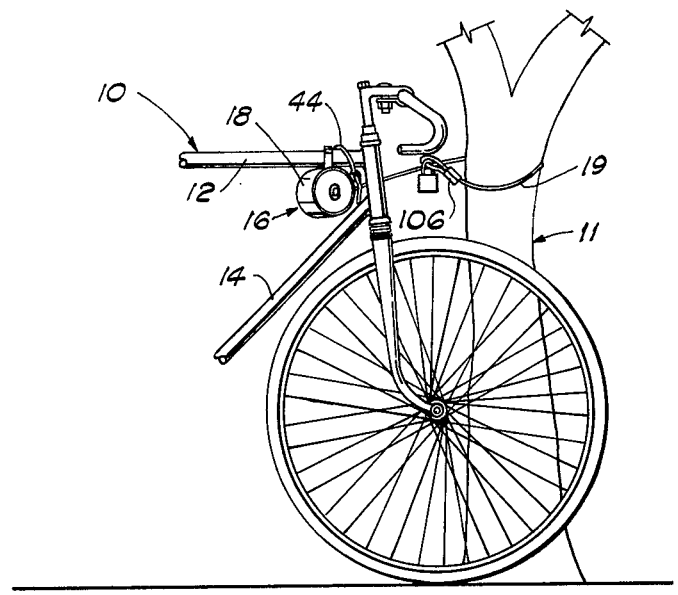
FIG. 1 illustrates a bicycle secured to a tree by the use of the bicycle lock of the present invention.

In FIG. 1 of the drawings, a bicycle 10 is illustrated as it appears when locked or secured to a tree 11. The bicycle includes a conventional frame which has bars 12 and 14 in conventional fashion. The lock of the present invention is designated generally by reference numeral 16 and includes, as parts thereof, a reel housing 18 and an elongated flexible cable 19. In the illustrated usage of the lock 16, the reel housing 18 is mounted on the frame bar 12. It will be apparent, however, that the lock 16 could be mounted on other of the frame elements of the bicycle, if this should be preferred. In referring to FIGS. 2–5 of the drawings, it will be noted that the housing 18 is of generally cylindrical shape and includes a pair of opposed, parallel side walls 20 and 22 and a peripheral or circumferential wall 24 which extends between and interconnects the side walls. A large rectangular opening 26 is provided at one side of the peripheral wall 24 for a purpose hereinafter described.

Figure 2:
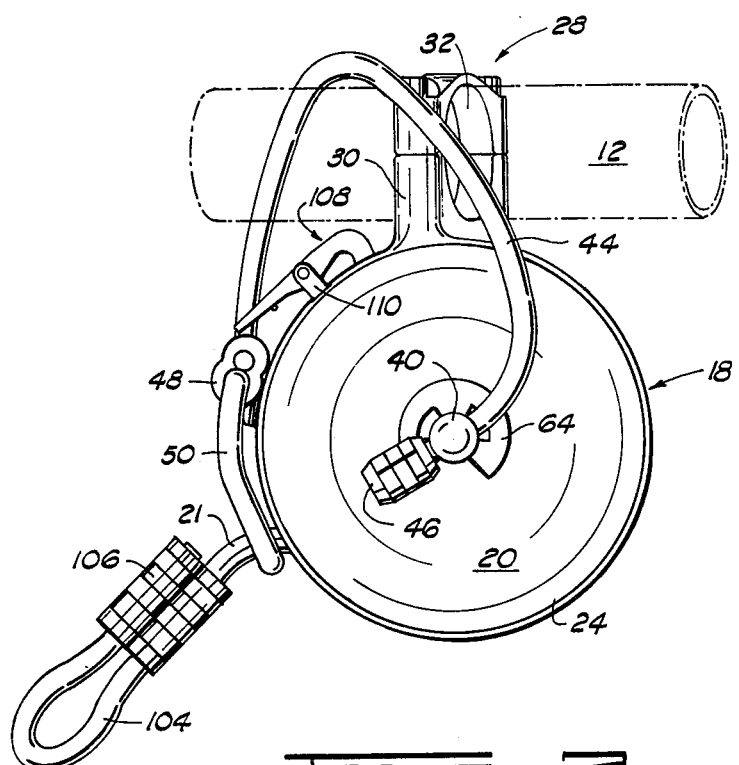
FIG. 2 is a side elevation view of the bicycle lock of the invention as it is mounted on one of the bars of the frame of a bicycle, which bar is illustrated in dashed lines.

A two-part bar clamp 28 is secured to the outer side of the housing and includes a base part 30 having a semi-circular opening formed therein, and an upper cap part 32 which has a semi-circular opening complementary in configuration to the opening formed in the base part. Thus, when the cap part 32 and base part 30 are joined by means of suitable threaded bolts 34 and 36 extended through threaded openings in the two parts, a circular opening is formed through the two-part bar clamp when assembled as shown. The bar clamp 28 is utilized to secure the housing 18 on the frame bar 12 as shown in FIG. 2.

Extending through the side walls 20 and 22 of the reel housing 18 is a shaft 40. The ends of the shaft project to the outer sides of the side walls as best illustrated in FIG. 5. One end of the shaft 40 is provided with a passageway or bore 42 formed therethrough to receive an end of a safety cable 44. The safety cable 44 is engaged wih the bore-carrying end of the shaft 40 by means of a retainer stud 46 clamped around the end of the safety cable which is extended through the bore 42. The opposite end of the safety cable 42 is securely clamped in a sleeve 48 which is welded or otherwise suitably secured to a guide ring 50. It will be noted that the safety cable 44 has a central loop or bight portion which is defined between its ends secured to the shaft 40 and to the sleeve 48 on the guide ring 50. The sleeve 48 carries a pair of spaced securing eyes 52 and 54 which are used for mounting the guide ring 50 and sleeve 48 on a peripheral wall 24 of the housing 18 by means of a pair of screws which are extended through the eyes 52 and 54 into aligned, internally threaded holes formed in the peripheral wall. It will be noted that the guide ring is of generally trapezoidal configuration, and that, when mounted on the peripheral wall 24 of the housing 18, it is aligned with a part of the opening 26 in the housing.

The opposite end of the shaft 40 from the end which carries the bore 42 is provided with an axially extending internally threaded bore. A threaded screw 60 is threaded into this bore and forces a friction washer 62 against the outer side of the side wall 22 of the housing 18. In this manner, the shaft 40 is prevented from rotating relative to the housing 18. At its other end, the shaft 40 is prevented from axial movement relative to the housing 18 by means of a split ring washer 64 which is snapped into a peripheral groove 66 formed around the shaft 40 as shown in FIGS. 4 and 5.

The shaft 40 has rotatably mounted thereon, a drum or cable reel designated generally by reference numeral 68. The cable reel 68 is preferably formed from synthetic resin as an integral unit having a relatively low coefficient of friction. The cable reel includes a generally cylindrical end portion 70 (see FIG. 5) of relatively large diameter, which end portion terminates in an annular flange 72 which is positioned near to, and faces, the side wall of the housing 18. From the cylindrical portion 70, the cable reel 68 tapers to a reduced diameter at its end opposite the annular flange 72, and thus includes a generally frusto-conical portion 74. The relatively large diameter end portion of the cable reel 68 has formed therein, a bore 76 which intersects a counterbore 78 constituting a torsion spring recess in the cable reel.

At its small diameter end, the cable reel 68 has a generally rectangular slot or relief 80 formed therein and projecting radially inwardly from the frusto-conical surface 74 as shown in FIG. 5. Closely adjacent the recess 80 is a cable lead-in groove 82.

When the cable reel 68 is mounted on the shaft 40 in the position illustrated in FIG. 5, a convoluted torsion spring 84 is placed within the counterbore 78 and a lip 86 formed on its radially innermost convolution is engaged with a mating slot 88 formed in a hub 40a carried on the shaft 40. A pair of small flanges 90 formed on the outer end of the torsion spring engage a slot 92 formed in the internal wall defining the counterbore 78 in the cable reel 68. The large diameter end of the cable reel 68 is closed by means of a synthetic resin closure cap 94 which is pressed into the bore 76, and which carries a central hub 96 which rotatably engages a neck portion 40b formed on the shaft 40 (see FIGS. 4 and 5).

At the small diameter end of the cable reel 68, a cable anchor block 94 which is of rectangular configuration is matingly fitted in the rectangular recess 80, and is provided with a bore extending therethrough to permit passage of the shaft 40 therethrough as shown in FIGS. 4 and 5. The cable anchor block 94 is retained in the relief or recess 80 by means of a synthetic resin face plate 98 which is secured to one side of a ratchet plate 100. The ratchet plate 100 and face plate 98 have a number of aligned screw accommodating holes 101 formed therein to permit the ratchet plate and face plate to be secured to the end face of the cable reel 68. As shown in FIG. 5, screws 102 are passed through these holes and through the cable anchor block 94 into the cable reel 68. The ratchet plate is thus secured or keyed to the cable reel 68, and is mounted upon the reel for rotation around the shaft 40.

The cable anchor block 94 has one end of the elongated anchoring or securing cable 19 firmly engaged therewith. A major portion of the remaining length of a securing cable 19 is then wound in a plurality of convolutions around the cable reel 68, with the portion of the securing cable immediately adjacent the anchor block 94 being led through the lead-in groove 82 and then onto the outer periphery of the frusto-conical portion 74 of the reel. The other end of the securing cable 19 from that end which is secured to the anchor block 94 is passed through the guide ring 50. A loop is provided at the end of the securing cable 20 which is outside of the cable reel housing 18 by means of a clamp 106 as shown in FIG. 2.

A pawl lever, designated generally by reference numeral 108, is pivotally supported on a U-shaped pivot bracket 110 which is secured to the peripheral wall 24 of the housing 18. The pawl lever 108 is mounted on one side of the housing 18 at a position such that a dog 112 carried at one end of the pawl lever extends through an opening or slot 114 formed in the peripheral wall 24, and engages the teeth of the ratchet wheel 100 to prevent rotation of the ratchet wheel in one direction of rotation. The pawl lever 108 is biased to a ratchet wheel-engaging position by a spring 116 which extends around a pivot pin 118 used to support the pawl lever in the U-shaped pivot bracket 110.

OPERATION AND USE

As the lock is sold for installation by cyclists, the cable reel 68 is mounted within the housing 18 in the manner illustrated in FIG. 5. With the cable reel 68 so mounted, and having the ratchet wheel 100 secured to one end thereof, the reel can be rotated in a direction on the shaft 40 such that the securing cable 19 can be paid out and unwound from the reel without the dog 112 of the pawl lever 108 engaging the teeth of the ratchet wheel. As the securing cable 19 is paid out from the cable reel 68, the torsion spring 84 is coiled up more tightly and resiliently opposes the reeling out of the cable. After a sufficient amount of the securing cable 19 has been paid out to permit extension of this cable around the tree or other stationary structure for the purposes of locking the bicycle in position, the cable reel 68 will automatically reverse a part of a turn under the biasing influence of the uncoiled torsion spring 84. At this point, however, the dog 112 of the pawl lever 108 will engage a tooth of the ratchet wheel 100 and further reverse rotation of the cable reel will be prevented.

As the bicycle lock 16 is manufactured for sale, the upper portion 32 of the two part bar clamp 28 is disconnected from the lower portion 30 thereof, and the guide ring 50 and associated sleeve 48 are not secured to the peripheral wall 24 of the housing 18. The purchaser of the lock 16 mounts the lock on the bicycle 10 by placing the upper portion 32 of the bar clamp 28 in position over the lower portion 30 with the frame bar 12 between, and then extends the screws 34 and 36 through the aligned holes to engage the two parts of the bar clamp. Next, the cyclist passes the safety cable 44, the sleeve 48 and the guide ring 50 connected thereto over the bar 12 of the bicycle framework in the manner shown in FIG. 2. At this time, the guide ring 50 and sleeve 48 are not connected to the peripheral wall 24 of the housing 18. Next, the free (looped) end of the securing cable 19 is passed through the largest portion of the opening through the guide ring 50. The guide ring and the associated sleeve are then ready for mounting on the peripheral wall 24 of the housing 18 by means of screws extended through the eyes 52 and 54 as shown in FIG. 3.

It will be noted that when this assembly of the lock 16 on the bicycle 10 has been accomplished, a form of double securement is provided. First, the housing 18, as well as the lock as a whole, is clamped on a bar 12 of the frame by means of the two part bar clamp 28. The safety cable 44, however, provides additional securement to the frame of the bicycle in that the bight portion of this cable has been looped over the bar 12 of the frame. Thus, even were the top part 32 of the bar clamp 28 removed from the lower portion 30 thereof by a vandal or a thief having suitable tools to accomplish this, the housing 18 would still be retained on the bar 12 as a result of the extension of the bight of the safety cable 44 over this bar, and the securement of opposite ends of the safety cable to the shaft 40 and to the sleeve 48, respectively. Should the would-be thief remove the screws extended through the eyes 52 and 54 so as to detach the sleeve 48 and guide ring 50 from the housing 18, the lock 16 would still be engaged with the bar 12 of the bicycle frame by reason of the engagement of the guide ring 50 with the securing cable 19. It will thus be perceived that the lock is very secure in the sense of the manner in which it is connected or engaged with the frame of the bicycle, and that only by total destruction of the lock assembly by driving the shaft 40 out of the housing 18, or by cutting two cables, or by removal of the top part of the two part bar clamp 28 in addition to all these things, could the lock be disconnected from the frame of the bicycle.

It will further be perceived that in the use of the bicycle lock of this invention, the cyclist can very quickly and very easily draw out the compactly stored securement cable 19 from its position of storage on the cable reel 68 within the housing 18 to any length that is necessary to extend the cable around a tree or post and lock the cable to itself with an ordinary small padlock. After the use of the lock when the cyclist is ready to depart, the securement cable 19 is automatically reeled back into the housing upon the cable reel 68 as a result of the prior loading of the torsion spring 84. This can be effected very easily by simply unlocking the free end of the securement cable 19, and tripping the ratchet wheel 100 by depressing the pawl lever 108 against the bias of the spring 116. As the securement of anchoring cable 19 is paid out or is reeled in, its winding up on the cable reel 68 is guided and controlled by its frictional contact with the guide ring 50. It will be noted that the longest leg of the trapezoid constituted by the guide ring 50 inclines in the same direction as the direction of taper of the frusto-conical portion 74 of the cable reel 68. Thus, as the securing cable 19 is wound upon the reel 68 during retraction of the cable, the cable will follow the incline of the longest leg of the guide ring 50 with which leg the cable is in frictional sliding engagement, and the convolutions of the cable made up upon the reel 68 will not overlap or stack up at one location on the reel.

Although a preferred embodiment of the invention has been hereinbefore described, and is illustrated in the accompanying drawings, it will be understood that various changes and innovations can be effected in the illustrated and described structure without departure from the basic principles which underlie the invention. Changes and modifications of this type which continue to rely upon such basic principles are deemed to be circumscribed by the spirit and scope of the invention except as the same may be necessarily limited by the appended claims or reasonable equivalents thereof.

What is claimed is:

1. A bicycle lock comprising:
  a reel housing having a cable opening therein;
  a shaft projecting through said housing;
  a cable reel mounted on said shaft for rotation in said housing;
  spring means connected between said shaft and said cable reel for resiliently opposing rotation of said cable reel in one direction on said shaft;
  a guide ring detachably secured to said housing opposite said opening;

a securing cable wound upon said cable reel and projecting through said cable opening and through said guide ring;

a safety cable having one end connected to said housing, a second end secured to said guide ring and connected by said guide ring to the securing cable extended therethrough, and a bight portion between said ends of said safety cable for looping over and engaging a part of the frame of the bicycle; and a two-part bar clamp secured to the outer side of said housing and including:

a base part having a semicircular opening therein;

an upper cap part having a semicircular opening therein dimensioned to mate with the semicircular opening in said base part; and means for detachably engaging said base part and said upper cap part with each other and about a portion of a bicycle frame.

2. A bicycle lock as defined in claim 1 wherein said safety cable has said one end connected to an end of said shaft which projects through the outer side of said housing.

3. A bicycle lock as defined in claim 1 wherein said cable reel has a first end and a second end, and is further characterized as including:

a first end portion of generally cylindrical configuration adjacent said first end and defining therewithin, generally cylindrical bore means formed concentrically within said cylindrical first end portion and about said shaft; and a second end portion positioned between said cylindrical first end portion and the second end of said reel, said second end portion being of frusto-conical configuration and of diminishing diameter from the location adjacent said first end portion to said second end;

and wherein said lock further includes:

a concentrically convoluted torsion spring positioned within said generally cylindrical bore means and around said shaft, said torsion spring including a first end connected to said shaft and a second end connected to said cable reel.

4. A bicycle lock as defined in claim 1 and further characterized as including:

a ratchet wheel secured to said cable reel and rotatable therewith on said shaft; and a pawl lever secured to the outer side of said housing and having a dog thereon projecting through a second opening in said housing into engagement with said ratchet wheel.

5. A bicycle lock comprising:

a reel housing having a cable opening therein;

a shaft projecting through said housing;

a cable reel mounted on said shaft for rotation in said housing;

spring means connected between said shaft and said cable reel for resiliently opposing rotation of said cable reel in one direction on said shaft;

a guide ring detachably secured to said housing opposite said opening;

a securing cable wound upon said reel and projecting through said opening and through said guide ring;

a safety cable having one end connected to said housing, a second end secured to said guide ring and connected by said guide ring to said safety cable extended therethrough, and further having a bight portion between said ends for looping over and engaging a part of the frame of the bicycle;

a bar clamp secured to the outer side of said housing and including means for detachably mounting said housing on a bar of the bicycle frame; and rotation-arresting means mounted on the outer side of said housing and including a portion projecting through a second opening in said housing and cooperating with said cable reel in one position of said rotation-arresting means for locking said cable reel against rotation under the influence of said spring means.

6. A bicycle lock comprising:

a reel housing having a cable opening therein;

a shaft projecting through said housing;

a cable reel rotatably mounted on said shaft and having a first end and a second end, said cable reel being further characterized in including:

a first end portion of generally cylindrical configuration adjacent said first end and defining therewithin generally cylindrical bore means formed concentrically within said cylindrical first end portion and about said shaft; and a second end portion positioned between said cylindrical first end portion and the second end of said reel, said second end portion of frusto-conical configuration and of diminishing diameter from a location adjacent said first end portion to said second end;

a concentrically convoluted torsion spring positioned within said generally cylindrical bore means and around said shaft, said torsion spring including a first end connected to said shaft and a second end connected to said cable reel;

a securing cable wound upon said reel and projecting through the opening in said housing;

a guide ring of substantially trapezoidal configuration secured to said housing and including four sides joined together to form said ring, the longest side of said trapezoidally shaped guide ring being positioned to extend substantially parallel to the outer periphery of the frusto-conical configured second end portion of said cable reel, whereby said guide ring guides said securing cable in axial movement along said cable reel during the winding and unwinding of said securing cable on said cable reel, said securing cable being extended through said guide ring after projection through the cable opening in said housing;

a safety cable having one end connected to said housing, a second end connected to said guide ring and a bight portion between said ends for looping over and engaging a part of the frame of the bicycle; and a two-part bar clamp secured to the outer side of the housing and including:

a base part having a semicircular opening therein;

an upper cap part having a semicircular opening therein dimensioned to mate with the semicircular opening in said base part; and means for detachably engaging said base part and said upper cap part with each other and about a portion of a bicycle frame.

7. A bicycle lock as defined in claim 6 wherein said safety cable has said one end connected to an end of said shaft which projects through the outer side of said housing.

8. A bicycle lock as defined in claim 7 and further characterized as including spring means connected between said shaft and said cable reel for resiliently opposing rotation of said cable reel in one direction on said shaft.

9. A bicycle lock as defined in claim 8 and further characterized as including:
- a ratchet wheel secured to said cable reel and rotatable therewith on said shaft; and
- a pawl lever secured to the outer side of said housing and having a dog thereon projecting through a second opening in said housing into engagement with said ratchet wheel.

10. A bicycle lock comprising:
- a hollow reel housing of generally cylindrical configuration and including two opposed, substantially parallel side walls and an annular peripheral wall between said side walls, said annular peripheral wall having an opening therethrough into the interior of the housing;
- a shaft extending through said housing and secured to said side walls;
- a cable reel having first and second ends and rotatably mounted on said shaft, said reel having a first end portion adjacent said first end and of generally cylindrical configuration, said first end portion extending concentrically around said shaft, and said cable reel further including a second end portion of frusto-conical configuration extending concentrically around said shaft and disposed contiguously to said first cylindrical end portion, said second end portion of frusto-conical configuration having a diminishing diameter from its point of junction with said first end portion to the second end of said cable reel;
- a trapezoidally shaped guide ring mounted on the annular peripheral wall of said housing adjacent said opening and including a side of said ring aligned with, and extending substantially parallel to, the line of taper of said frusto-conical end portion of said cable reel; and
- an elongated flexible cable having:
  - a first end secured to said frusto-conically shaped end portion of said reel at the point of its smallest diameter;
  - a portion between the first and second ends of the cable extending through said guide ring and wound around said reel in a plurality of convoluted turns, with those turns on said cylindrical end portion of the reel being connected to the part of said cable passing through said guide ring, and those turns on said frusto-conical end portion being that portion of the cable extending between said first end of the cable and the turns thereof on said cylindrical portion of the reel.

11. A bicycle lock as defined in claim 10 and further characterized as including:

spring means connected between said shaft and said reel housing for resiliently opposing the rotation of said reel housing in one direction of rotation on said shaft; and
means mounted on said housing for selectively arresting the movement of said cable reel in one direction of rotation opposite to the direction of rotation of said cable reel in opposition to the resilient bias of said spring.

12. A bicycle lock as defined in claim 10 and further characterized as including a safety cable mounted outside said housing and connected thereto to define a bight portion engageable with a portion of the frame of a bicycle to retain said reel housing on said frame by means of said safety cable.

13. A bicycle lock as defined in claim 12 and further characterized as including a bar clamp secured to said housing and including detachably engageable parts facilitating clamping said bar clamp on the frame of a bicycle.

14. A bicycle lock as defined in claim 12 wherein one end of said safety cable is connected to said shaft and the other end thereof is connected to said guide ring.

15. A bicycle lock comprising:
- a reel housing having a cable opening therein;
- a shaft projecting through said housing;
- a cable reel mounted on said shaft for rotation in said housing and having a first end and a second end, said cable reel further including a frusto-conically configured end portion adjacent said second end;
- a four-sided, trapezoidally configured guide ring secured to said housing opposite said opening and including a longest side positioned to substantially parallel the outer periphery of the frusto-conically configured end portion of said cable reel;
- a securing cable wound upon said reel and projecting through said opening and through said trapezoidally configured guide ring whereby said guide ring guides said securing cable in axial movement along said cable reel during the winding and unwinding of said securing cable on said cable reel;
- a safety cable having its opposite ends connected to said housing and including a bight portion between its ends for looping over and engaging a part of the frame of the bicycle;
- a spring connected between said shaft and said cable reel for resiliently urging said cable reel in rotation in one direction; and
- a bar clamp secured to the outer side of said cable reel housing and including means for detachably mounting said housing on a bar of a bicycle frame conjunctively with the mounting thereto by use of said safety cable.

* * * * *